United States Patent
Yerli

(10) Patent No.: US 12,040,993 B2
(45) Date of Patent: Jul. 16, 2024

(54) SOFTWARE ENGINE VIRTUALIZATION AND DYNAMIC RESOURCE AND TASK DISTRIBUTION ACROSS EDGE AND CLOUD

(71) Applicant: The Calany Holding S. À R.L., Luxembourg (LU)

(72) Inventor: Cevat Yerli, Frankfurt am Main (DE)

(73) Assignee: THE CALANY HOLDING S. À R.L., Luxembourg (LU)

( * ) Notice: Subject to any disclaimer, the term of this patent is extended or adjusted under 35 U.S.C. 154(b) by 0 days.

(21) Appl. No.: 16/904,130

(22) Filed: Jun. 17, 2020

(65) Prior Publication Data
US 2020/0403935 A1  Dec. 24, 2020

Related U.S. Application Data

(60) Provisional application No. 62/863,108, filed on Jun. 18, 2019.

(51) Int. Cl.
*H04L 12/911* (2013.01)
*G06F 9/455* (2018.01)
(Continued)

(52) U.S. Cl.
CPC .......... *H04L 47/82* (2013.01); *G06F 9/45558* (2013.01); *H04L 67/10* (2013.01); *G06F 2009/45595* (2013.01)

(58) Field of Classification Search
CPC ..... H04L 47/82; H04L 67/10; H04L 41/0893; G06F 9/45558; G06F 2009/45595; G06F 9/5072; G06F 9/5077
(Continued)

(56) References Cited

U.S. PATENT DOCUMENTS 7,451,196 B1   11/2008  de Vries et al.
7,843,471 B2   11/2010  Doan et al.
(Continued)

FOREIGN PATENT DOCUMENTS

AU   2014201887 A1 *  5/2014  ......... G07F 17/3213
CA       2881354 A1 * 10/2013  ............. G06F 19/28
(Continued)

OTHER PUBLICATIONS

Microsoft Developer: "Developing Mobile Augmented Reality (AR) Applications with Azure Spatial Anchors—BRK2034", May 14, 2019 (May 14, 2019), pp. 1-8, XP54981052, Retrieved from the Internet: URL:https://www.youtube.com/watch?v=CVmfP8TaqNU [retrieved on Oct. 30, 2020].
(Continued)

*Primary Examiner* — Emmanuel L Moise
*Assistant Examiner* — Berhanu Shitayewoldetadik
(74) *Attorney, Agent, or Firm* — BRYAN CAVE LEIGHTON PAISNER LLP

(57) ABSTRACT

A system and method for enabling software engine virtualization and dynamic resource and task distribution across edge and cloud, comprising at least one cloud server comprising memory and at least one processor, the at least one cloud server hosting at least one cloud engine configured to store and process application data from one or more applications; one or more client devices connected to the cloud server via a network, the one or more client devices hosting at least one local engine configured to store and process application data from the one or more applications and to provide output to users; and a virtual engine hosted across edge and cloud configured to virtualize, via a virtualization logic component, one or more system network components, applications, and engine components, creating a virtual layer
(Continued)

connected to the one or more client devices and cloud server via the network.

22 Claims, 13 Drawing Sheets

(51) Int. Cl.
    *G06F 15/16*         (2006.01)
    *H04L 9/40*          (2022.01)
    *H04L 15/16*         (2006.01)
    *H04L 29/06*         (2006.01)
    *H04L 29/08*         (2006.01)
    *H04L 47/70*         (2022.01)
    *H04L 67/10*         (2022.01)

(58) Field of Classification Search
    USPC ........................................................ 709/226
    See application file for complete search history.

(56) References Cited

U.S. PATENT DOCUMENTS

| | | | |
|---|---|---|---|
| 9,072,972 B2 | 7/2015 | Ahiska et al. | |
| 9,098,167 B1 | 8/2015 | Issa et al. | |
| 9,111,326 B1 | 8/2015 | Worley, III et al. | |
| 9,160,680 B1* | 10/2015 | Skvortsov | H04L 63/1408 |
| 9,641,643 B2* | 5/2017 | Mohaban | G06F 16/17 |
| 10,038,741 B1* | 7/2018 | Judge | H04L 67/10 |
| 10,206,094 B1 | 2/2019 | Wen et al. | |
| 11,032,164 B1 | 6/2021 | Rothschild et al. | |
| 11,304,771 B2* | 4/2022 | Panescu | A61B 1/00055 |
| 11,307,968 B2* | 4/2022 | Yerli | G06F 11/3668 |
| 11,310,467 B2* | 4/2022 | Allen | H04N 7/188 |
| 11,341,727 B2 | 5/2022 | Yerli | |
| 2006/0122917 A1 | 6/2006 | Lokuge et al. | |
| 2006/0184886 A1 | 8/2006 | Chung et al. | |
| 2007/0117631 A1* | 5/2007 | Lim | G07F 17/32 |
| | | | 463/42 |
| 2007/0222750 A1* | 9/2007 | Ohta | A63F 13/525 |
| | | | 345/158 |
| 2008/0268418 A1* | 10/2008 | Tashner | G09B 7/00 |
| | | | 715/706 |
| 2010/0287529 A1 | 11/2010 | Costa et al. | |
| 2011/0224811 A1 | 9/2011 | Lauwers et al. | |
| 2011/0295719 A1* | 12/2011 | Chen | G06Q 30/02 |
| | | | 455/414.1 |
| 2011/0320520 A1 | 12/2011 | Jain | |
| 2012/0149349 A1 | 6/2012 | Quade | |
| 2012/0190458 A1* | 7/2012 | Gerson | H04L 67/131 |
| | | | 345/473 |
| 2012/0281706 A1 | 11/2012 | Agarwal et al. | |
| 2012/0281708 A1 | 11/2012 | Chauhan et al. | |
| 2013/0044106 A1 | 2/2013 | Shuster et al. | |
| 2013/0117377 A1 | 5/2013 | Miller | |
| 2013/0219014 A1 | 8/2013 | Yerli | |
| 2013/0222385 A1* | 8/2013 | Dorsey | G06T 11/20 |
| | | | 345/427 |
| 2013/0225369 A1 | 8/2013 | Fisbein et al. | |
| 2014/0002444 A1 | 1/2014 | Bennett et al. | |
| 2014/0063004 A1 | 3/2014 | Hamilton, II et al. | |
| 2014/0125557 A1 | 5/2014 | Issayeva et al. | |
| 2014/0156846 A1* | 6/2014 | Stern | H04L 41/0613 |
| | | | 709/226 |
| 2014/0185616 A1* | 7/2014 | Bloch | G06F 9/45533 |
| | | | 370/392 |
| 2014/0229944 A1 | 8/2014 | Wang et al. | |
| 2014/0280644 A1* | 9/2014 | Cronin | G06F 16/444 |
| | | | 709/206 |
| 2014/0282535 A1* | 9/2014 | Sato | G06F 9/45558 |
| | | | 718/1 |
| 2015/0120931 A1 | 4/2015 | Padala et al. | |
| 2015/0212703 A1 | 7/2015 | Luckett, Jr. | |
| 2015/0237667 A1* | 8/2015 | Ghai | H04W 76/15 |
| | | | 370/338 |
| 2015/0296030 A1* | 10/2015 | Maes | G06F 3/0482 |
| | | | 715/736 |
| 2015/0310497 A1* | 10/2015 | Valin | H04L 51/08 |
| | | | 705/14.66 |
| 2015/0341223 A1 | 11/2015 | Shen et al. | |
| 2015/0348327 A1* | 12/2015 | Zalewski | G06F 3/01 |
| | | | 345/419 |
| 2016/0011896 A1* | 1/2016 | Khalid | H04L 41/5019 |
| | | | 718/1 |
| 2016/0142337 A1* | 5/2016 | Skvortsov | H04L 43/12 |
| | | | 709/226 |
| 2016/0154676 A1* | 6/2016 | Wen | G06F 9/45533 |
| | | | 718/1 |
| 2016/0197835 A1 | 7/2016 | Luft | |
| 2016/0198003 A1 | 7/2016 | Luft | |
| 2016/0293133 A1* | 10/2016 | Dutt | G06N 3/047 |
| 2016/0361658 A1 | 12/2016 | Osman et al. | |
| 2017/0048308 A1 | 2/2017 | Qaisar | |
| 2017/0054792 A1* | 2/2017 | Christopher, II | H04L 67/10 |
| 2017/0094018 A1 | 3/2017 | Ekstrom et al. | |
| 2017/0109187 A1 | 4/2017 | Cropper et al. | |
| 2017/0155672 A1 | 6/2017 | Muthukrishnan et al. | |
| 2017/0287496 A1 | 10/2017 | Heitkamp et al. | |
| 2017/0308696 A1* | 10/2017 | Patel | G06F 21/53 |
| 2017/0366472 A1* | 12/2017 | Byers | H04L 67/289 |
| 2018/0024537 A1* | 1/2018 | Chauvet | H04L 12/4641 |
| | | | 718/104 |
| 2018/0060948 A1 | 3/2018 | Mattingly et al. | |
| 2018/0093186 A1 | 4/2018 | Black et al. | |
| 2018/0109282 A1* | 4/2018 | Khan | H04L 7/0331 |
| 2018/0159745 A1* | 6/2018 | Byers | H04L 41/122 |
| 2018/0190017 A1 | 7/2018 | Mendez et al. | |
| 2018/0204301 A1 | 7/2018 | Featonby et al. | |
| 2018/0205619 A1 | 7/2018 | Rios et al. | |
| 2018/0225875 A1 | 8/2018 | Yasrebi | |
| 2018/0285767 A1* | 10/2018 | Chew | G06N 20/00 |
| 2018/0332132 A1* | 11/2018 | Sampath | H04L 67/01 |
| 2018/0336727 A1 | 11/2018 | Bastian et al. | |
| 2018/0373412 A1 | 12/2018 | Reif | |
| 2019/0121960 A1 | 4/2019 | Brown et al. | |
| 2019/0130631 A1 | 5/2019 | Gebbie et al. | |
| 2019/0158569 A1 | 5/2019 | Singleton, IV et al. | |
| 2019/0173773 A1* | 6/2019 | Baughman | H04L 47/822 |
| 2019/0197634 A1 | 6/2019 | Dange | |
| 2019/0206129 A1* | 7/2019 | Khalid | A63F 13/88 |
| 2019/0215381 A1* | 7/2019 | Mukund | H04L 67/63 |
| 2019/0287208 A1 | 9/2019 | Yerli | |
| 2019/0294721 A1 | 9/2019 | Keifer et al. | |
| 2019/0321725 A1 | 10/2019 | Zimring et al. | |
| 2019/0339840 A1 | 11/2019 | Park et al. | |
| 2019/0362312 A1 | 11/2019 | Platt et al. | |
| 2020/0007462 A1 | 1/2020 | Singhal et al. | |
| 2020/0007615 A1* | 1/2020 | Brebner | G06F 9/542 |
| 2020/0143583 A1* | 5/2020 | Jiang | G06T 15/005 |
| 2020/0151958 A1 | 5/2020 | Livneh | |
| 2020/0159421 A1* | 5/2020 | Karumbunathan | G06F 3/061 |
| 2020/0186445 A1 | 6/2020 | Govindaraju et al. | |
| 2020/0245160 A1* | 7/2020 | Chu | H04L 43/12 |
| 2020/0401436 A1* | 12/2020 | Yerli | G06F 3/011 |

FOREIGN PATENT DOCUMENTS

| | | | | |
|---|---|---|---|---|
| CA | 2899263 A1 * | 8/2014 | ............ | G06F 19/18 |
| CA | 3100815 A1 * | 9/2019 | ............. | A61N 5/103 |
| CA | 3097146 A1 * | 10/2019 | ........... | C12Q 1/6806 |
| CA | 3046247 A1 * | 12/2019 | ........... | G06F 16/254 |
| CA | 3000643 C * | 4/2020 | ........... | H04B 17/318 |
| CN | 102739771 A | 10/2012 | | |
| CN | 107148620 A | 9/2017 | | |
| CN | 107454128 A | 12/2017 | | |
| CN | 108369533 A | 8/2018 | | |
| CN | 109634720 A * | 4/2019 | ............. | G06F 13/20 |
| EP | 3 333 706 A1 | 6/2018 | | |
| WO | 2009/029559 A1 | 3/2009 | | |
| WO | 2015/123849 A1 | 8/2015 | | |
| WO | 2016/164178 A1 | 10/2016 | | |
| WO | 2017/064560 A1 | 4/2017 | | |
| WO | 2017/064560 A8 | 4/2017 | | |

(56) References Cited

FOREIGN PATENT DOCUMENTS

| WO | WO-2017064560 A1 * | 4/2017 | ............ G05B 15/02 |
| WO | 2017212036 A1 | 12/2017 | |
| WO | 2019/079826 A1 | 4/2019 | |

OTHER PUBLICATIONS

Extended European Search Report dated Nov. 24, 2020, issued in European Application No. 20180853.2, 12 pages.

Extended European Search Report dated Dec. 1, 2020, issued in European Application No. 20180906.8, 10 pages.

Hong, C., et al., "Resource Management in Fog/Edge Computing: A Survey," ACM Computing Surveys, 97: 1-22, Sep. 2019.

Atzori, L., et al., "SDN&NFV Contribution to IoT Objects Virtualization," Computer Networks, 149: 200-212, Feb. 2019.

Nastic, S., et al., "A Middleware Infrastructure for Utility-based Provisioning of IoT Cloud Systems," 2016 IEEE/ACM Symposium on Edge Computing (SEC), Washington D.C., Oct. 27-28, 2016, IEEE Computer Society, pp. 28-40.

Bruschi, R., et al., "Personal Services Placement and Low-Latency Migration in Edge Computing Environments," 2018 IEEE Conference on Network Function Virtualization and Software Defined Networks (NFV-SDN): 5GNetApp—5G-ready Network Applications, Services Development and Orchestration over Application-aware Network Slices @IEEE NFV-SDN 2018, Verona, Italy, Nov. 27-29, 2018, IEEE, 6 pages.

Extended European Search Report dated Nov. 18, 2020, issued in European Application No. 20180891.2, 14 pages.

Cohen, B., et al., "Cloud Edge Computing: Beyond the Data Center," Berlin Summit at OpenStack, Oct. 2, 2018, <https://www.openstack.org/edge-computing/cloud-edge-computing-beyond-the-data-center/> [retrieved Jun. 11, 2019], 22 pages.

Kaul, A., et al., "Using Virtualization for Distributed Computing," International Journal of Advances in Electronics and Computer Science 2(7):37-39, Jul. 2015.

Mital, Z., "Distributed Message Exchange System Modelling," in A. Sydow et al. (eds.), "Systems Analysis and Simulation," 1988, pp. 196-197, Akademie-Verlag Berlin.

Office Action dated Jul. 17, 2021, issued in U.S. Appl. No. 16/904,371, filed Jun. 17, 2020, 18 pages.

Final Office Action dated Feb. 9, 2022, issued in U.S. Appl. No. 16/904,371, filed Jun. 17, 2020, 20 pages.

Office Action dated Feb. 22, 2022, issued in U.S. Appl. No. 16/904,441, filed Jun. 17, 2020, 34 pages.

Office Action dated Aug. 17, 2022, issued in U.S. Appl. No. 16/904,371, filed Jun. 17, 2020, 24 pages.

Office Action dated Oct. 7, 2022, issued in U.S. Appl. No. 16/904,441, filed Jun. 17, 2020, 30 pages.

Office Action dated Mar. 8, 2023, issued in U.S. Appl. No. 16/904,371, filed Jun. 17, 2020.

Office Action dated Apr. 28, 2023, issued in U.S. Appl. No. 16/904,441, filed Jun. 17, 2020.

European Search Report for EP Patent Application No. 20180906.8, dated Nov. 18, 2020, 7 pages.

\* cited by examiner

SOFTWARE ENGINE VIRTUALIZATION AND DYNAMIC RESOURCE AND TASK DISTRIBUTION ACROSS EDGE AND CLOUD

CROSS-REFERENCE TO RELATED APPLICATION

This application claims the benefit of Provisional Application No. 62/863,108, filed Jun. 18, 2019, the entire disclosure of which is hereby incorporated by reference herein for all purposes.

FIELD

The present disclosure relates generally to distributed computing.

BACKGROUND

Software engines are programs that perform core or essential functions for other programs. Software engines are used in operating systems, subsystems, or application programs to coordinate the overall operation of other programs. For example, a 3D engine, or software game engine, plays an increasingly important role in graphics applications. One major task of a software game engine is to provide the most realistic and highest quality of graphics possible at a real-time performance. A software game engine is typically provided as computer-executable code that is executed on a CPU. For example, the game engine may typically run on a processor or microprocessor of a computing device, such as a CPU of a personal computer, a console, a mobile phone or a tablet. Hence, performance of the CPU may determine the performance of a software game engine. Other game engines can be hosted at centralized servers in order to take advantage of the larger computing capabilities of centralized computing.

Game engines enable implementation of aspects such as the management of an animated model, the collisions between objects, and the interaction between the player and the game. Many recent games use engines that go beyond visual and interaction aspects. For example, programmers can rely on a physics engine to simulate physics laws within the virtual environment, an audio engine to add music and complex acoustical effects, and an artificial intelligence (AI) engine to program non-human player behaviors. Properties expected for a 3D interface are very close to the ones for 3D video games. Thus, game engines may be used in any type of application that requires rendering of 3D graphics at a real-time performance, including applications in Virtual Reality (VR), Augmented Reality (AR), Mixed Reality (MR), or combinations thereof, for a variety of industries.

Using centralized computing for running software engines and processing applications is characterized by a relatively high latency resulting from the distance between the user and the data centers hosting the servers. Moving the software engine and most or all of the computing tasks to the client devices can result in very low latency because of the proximity of the processor to the user, but limited resources, such as memory and computing capabilities, can hinder the capabilities and performance of the applications.

New applications, services, and workloads increasingly demand a different kind of architecture built to support a distributed infrastructure that can satisfy higher bandwidth demands, low latency, or widespread compute capacity across many sites. Technologies such as the Internet of Things (IoT), AR, VR, autonomous driving, and AI may exceed the capabilities of centralized computing and have led to the development of architectures that leverage the ample resources of storage, communication, and computation of fog computing. Fog computing is a technology operating to use resources already present at the cloud edge to provide a network that can support low latency, geographically distributed mobile applications. Fog computing benefits from virtualization and abstraction of the resource and uses application programming interfaces (APIs) to support interoperability between the edge and the cloud.

Fog computing uses network functionality virtualization (NFV), which virtualizes entire classes of network node functions into building blocks that may connect to create communication services. A virtualized network function, or VNF, may consist of one or more virtual machines (VMs) running different software and processes, on top of standard high-volume servers, switches and storage devices, or even cloud computing infrastructure, instead of having custom hardware appliances for each network function. However, although several functions and resources can be virtualized, software engines themselves comprising a number of software components such as libraries, software development kits (SDKs), and objects, tend to be hosted and predominantly serviced by either the server side or the edge side of the network, inefficiently distributing the software engine tasks and the actual resources required for running the applications.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The current disclosure provides systems and methods to solve one or more drawbacks disclosed in the background or other technical problems by virtualizing software engines and dynamically distributing engine tasks and allocating system resources in a virtual layer across edge and cloud. The "edge" in the current disclosure refers to the outskirts of an administrative domain, e.g., as close as possible to client devices of end users. In some cases, the edge of the domain may include the client devices themselves. In such cases, the phrase "across edge and cloud" may be used to refer to an arrangement in which some components of the software engine are hosted on one or more cloud servers and other components are hosted on one or more client devices. As the software engines are virtualized, execution of tasks required by applications can be performed from one or more sources across the edge and the cloud depending on engine tasks and resources distribution rules. Thus, system resources such as memory, bandwidth, and computing resources are optimized and dynamically allocated across edge and cloud.

A disclosed system for enabling software engine virtualization and dynamic resource and task distribution across edge and cloud of the current disclosure comprises at least one cloud server comprising memory and at least one processor, the at least one cloud server hosting a virtualization logic component and at least one cloud engine of a software engine, the at least one cloud engine configured to store and process application data from one or more applications; one or more client devices connected to the cloud server via a network, the one or more client devices hosting at least one local engine of the software engine, the at least one local engine configured to store and process application data from the one or more applications and to provide output to users; and a virtual engine hosted across edge and cloud, the virtual engine configured to virtualize, via the virtualization logic component, the one or more applications, and components of the at least one cloud engine and the at least one local engine, creating a virtual layer connected to the one or more client devices and cloud server via the network.

In some embodiments, the virtualization logic is provided in the server, as is the virtual engine performing dynamic resource and task distribution, but as they are fully virtualized through the virtualization logic, the system can take resources not just from a particular cloud server but from other devices residing anywhere from the edge to the cloud, such as fog servers, other client devices, other cloud servers, etc. For example, a sound engine may be hosted at a fog server, but a user device accessing and using the sound engine, as the user device accesses the sound engine through the virtual engine, may also be able to access the sound engine if it were hosted in a cloud server or in another user device.

In some embodiments, the virtual layer interfaces the one or more applications via suitable application programming interfaces (APIs). The one or more APIs ensure that the edge processing functions and the cloud computing system can communicate with each other effectively and dynamically allocate resources and tasks.

In some embodiments, the system further comprises one or more fog servers comprising memory and at least one processor, the fog servers being located in areas proximate to client devices and configured to assist the cloud servers and client devices in the processing of application data from the one or more applications. In some embodiments, the at least one application is hosted by the one or more client devices, cloud servers, fog server, or combinations thereof.

The virtual engine comprises at least one virtualization logic component configured to virtualize the one or more system network components, applications and engine components; at least one optimization component configured to assess engine task and system resource requirements from the one or more applications; and at least one system resources distribution platform configured to allocate the required engine tasks and system resources. Thus, for example, tasks typically performed by a single software engine installed in one of a client device or a cloud server and the resources required to execute those tasks may be distributed across different system network components such as one or more client devices, fog serves, or cloud servers, enhancing resource allocation efficiency. In some embodiments, the assessment may be done continuously, at any moment that at least one application requiring engine tasks is being used, by detecting a change in the resource and task. The resource and task requirements may vary consistently as there may be, in some scenarios, thousands of users using applications.

In some embodiments, the virtualization logic virtualizes the clients, servers, etc., enabling their resources to be part of a virtual resource pool that can be dynamically optimized and allocated/distributed by the optimization component and distribution platform, respectively.

In some embodiments, the virtual engine further comprises one or more function-specific sub-engines. In an example, the function-specific sub-engines comprise one or more of an audio engine, a physics engine, a graphics engine, an AI engine, a search engine, amongst others. Further in this example, tasks related to the sound engine may be performed by the client device, while tasks related to the physics engine and graphics engine may be related at the fog servers, and tasks related to the AI engine may be performed at the cloud server, respectively allocating resources from each of those sources.

According to an embodiment, the one or more software engines are installed in at least one of the cloud server, fog servers, and client devices. As the network resources are available within the virtual layer, the application may dynamically request resources along with engine tasks that may be performed at either of the cloud server, fog servers, and client devices, or combinations thereof, depending on the optimization parameters in the optimization component. In further embodiments, a distribution of the one or more sub-engines of the software engine may be dynamically performed across edge and cloud.

In some aspects of the current disclosure, the real world is virtualized into a persistent virtual world system comprising virtual replicas of real world elements. The virtual replicas may be stored in a database or data structure and may be linked to the real world elements via sensing mechanisms. The persistent virtual world system may be divided into virtual cells, which refer herein to the discrete pieces of the virtual world that are managed across a plurality of computer nodes allocating required computing resources. Furthermore, resource optimization techniques of the current disclosure may be provided in either a virtual or a real world scenario in any of virtual reality, augmented reality, or mixed reality.

In some embodiments, the optimization component includes, at instruction-set level, resource allocation parameters across edge and cloud including servers computation, memory, and storage capabilities; end-to-end response time; application resources demand; client computation, memory, and storage capabilities; demanded and available quality of service; service level agreement; distance between devices and servers; bandwidth capacity; and level of detail, amongst others. The resource allocation parameters are dynamically assessed by the optimization component in order to coordinate engine task distribution and allocate resources accordingly via a distribution platform.

In some embodiments, the distribution platform of the virtual engine includes one or more virtual cells, or topics, linked to a plurality of physical network resources, the virtual cells being configured to retrieve and allocate corresponding resources across edge and cloud to end users. The distribution platform may be, for example, a distributed message exchange service. The distribution platform may be implemented in one or more several thousands of nodes, or virtual cell hosts, which may be physically hosted at one or more client devices, fog servers, or cloud servers. A single instance of the distribution platform may service anywhere from one to several millions of virtual cells. Furthermore, a plurality of service instances (e.g., thousands) may act on one or several million virtual cells. In some embodiments, two or more nodes may also be setup for replication, which can be helpful in dynamic load balancing.

Applications of the current disclosure employing the one or more sub-engines may relate to fields such as the internet of things (IoT), digital realities (e.g., VR and AR), autonomous driving, or artificial intelligence (AI), to name a few. The client devices that may be used to run the one or more applications may be one or more mobile devices, personal computers, game consoles, media centers, and head-mounted displays, amongst others.

The virtual cells may additionally be assigned to locations in the real or virtual world, such that when a user requests services from a location, a virtual cell may already be assigned to retrieve and provide resources from pre-determined sources to the location of the user. In some embodiments, the locations in the real or virtual world to which the virtual cells may be assigned can be changed depending on optimization rules or as decided by a system administrator or designer.

The distribution platform implements caching of states within each virtual cell. For example, the virtual cells cache all the applications, virtual elements, or real elements, and their states within the corresponding virtual cells. When a service subscribes to a certain virtual cell, the service first receives all the cached states and subsequently receives the updates until finishing the subscription to the topic.

The distribution platform may follow a classic publish-subscribe paradigm, whereby the services may publish or subscribe to various virtual cells. The various services may be, for example, rendering, computing, simulating, and IoT updates. Thus, for example, a single client device may receive services from a plurality of sources, such as from a plurality of client devices or fog servers and from a cloud server.

According to an embodiment, the network may comprise antennas configured to transmit and receive radio waves that enable mobile across edge and cloud. Antennas may be connected through wired or wireless means to computing centers. In other embodiments, the antennas are provided within the computing centers and/or areas near the computing centers. In some embodiments, in order to service user devices and/or real objects located outdoors, the antennas may include millimeter wave (mmW)-based antenna systems or a combination of mmW-based antennas and sub-6 GHz antenna systems, herein grouped as and referred to as 5G antennas. In other embodiments, the antennas may include other types of antennas, such as 4G antennas, or may be used as support antennas for the 5G antenna systems. In embodiments where antennas used for servicing real-time 3D-based interaction devices located indoors, the antennas may use Wi-Fi, preferably, but not limited to, providing data at 60 GHz.

In other embodiments, global navigation satellite systems (GNSS), which refers generally to any satellite-based navigation systems like GPS, BDS, Glonass, QZSS, Galileo, and IRNSS, may be used for enabling positioning of devices. Employing signals from a sufficient number of satellites and techniques such as triangulation and trilateration, GNSS can calculate the position, velocity, altitude, and time of devices. In an embodiment, the external positioning system is augmented by assisted GNSS (AGNSS) through the architecture of existing cellular communications network, wherein the existing architecture comprises 5G. In other embodiments, the AGNSS tracking system is further supported by a 4G cellular communications network. In indoor embodiments, the GNSS is further augmented via radio wireless local area networks such as Wi-Fi, preferably, but not limited to, providing data at 60 GHz. In alternative embodiments, the GNSS is augmented via other techniques known in the art, such as via differential GPS (DGPS), satellite-based augmentation systems (SBASs), real-time kinematic (RTK) systems. In some embodiments, tracking of devices is implemented by a combination of AGNSS and inertial sensors in the devices.

In some embodiments, each of the virtual replicas of the persistent virtual world system may be geolocated using a reference coordinate system suitable for use with current geolocation technologies. For example, the virtual replicas may use a World Geodetic System standard such as WGS84, which is the current reference coordinate system used by GPS.

According to an embodiment, the sensing mechanisms mounted on the client devices include a combination of inertial tracking sensing mechanisms and transceivers. The inertial tracking sensing mechanisms can make use of devices such as accelerometers and gyroscopes, which may be integrated in an inertial measuring unit (IMU). The transceivers may be implemented to send and receive radio communication signals to and from antennas. In an embodiment, the transceivers are mmW transceivers. In embodiments where mmW antennas are employed, the mmW transceivers are configured to receive mmW signals from the antennas and to send the data back to the antennas. The inertial sensors, and positional tracking provided by mmW transceivers and the accurate tracking, low-latency and high QOS functionalities provided by mmW-based antennas may enable sub-centimeter or sub-millimeter positional and orientational tracking, which may increase accuracy when tracking the real-time position and orientation of the connected elements.

In some embodiments, tracking may be implemented by employing several techniques known in the art, such as time of arrival (TOA), angle of arrival (AOA), or other tracking techniques known in the art (e.g., GPS, visual imaging, radar technology, etc.). In alternative embodiments, the sensing mechanisms and transceivers may be coupled together in a single tracking module device. The sensing mechanisms of the client devices may also include one or more cameras. For example, the cameras may be depth-cameras installed in the client devices. The cameras may be configured to capture and provide the viewing position and orientation of the user which determines the viewing position and orientation of the virtual frames that are sent via the engine platform server.

According to an embodiment, a method enabling software engine virtualization across edge and cloud comprises the steps of providing a virtual engine hosted across one or more cloud servers and client devices connected via a network, the virtual engine comprising a virtualization logic component. The method ends by virtualizing, by the virtualization logic component of the virtual engine, one or more system network components, applications, and engine components, creating a virtual layer connected to the one or more client devices and cloud servers via the network.

According to an embodiment, a method enabling dynamic resource and task distribution across edge and cloud that may be used in through the virtual layer created, for example, through the method enabling software engine virtualization across edge and cloud. The method may begin by persistently assessing, by at least one optimization component in the virtual engine, engine task and system resource requirements from the one or more applications. Then, the method continues by optimizing, by the at least one optimization component in the virtual engine, the allocation of engine tasks and system resources based on said assessment. Finally, method may end by dynamically distributing on demand engine tasks and system resources across edge and cloud via a distribution component of the virtual engine based on the optimization performed by the at least one optimization component.

According to an embodiment, a non-transitory computer-readable media having stored thereon instructions configured to, when executed by one or more computers, cause the one or more computers to enable software engine virtualization and dynamic resource and task distribution across edge and cloud by performing steps comprising providing a virtual engine hosted across one or more cloud servers and client devices connected via a network, the virtual engine comprising a virtualization logic component; virtualizing, via the virtualization logic component of the virtual engine, one or more system network components, applications, and engine components, creating a virtual layer connected to the one or more client devices and cloud servers via the network; persistently assessing, by at least one optimization component in the virtual engine, engine task and system resource requirements from the one or more applications; optimizing, by the at least one optimization component in the virtual engine, the allocation of engine tasks and system resources based on said assessment; and dynamically distributing on demand engine tasks and system resources across edge and cloud via a distribution component of the virtual engine based on the optimization performed by the at least one optimization component.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary Other features and advantages will be apparent from the accompanying drawings and from the detailed description that follows below.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1A:
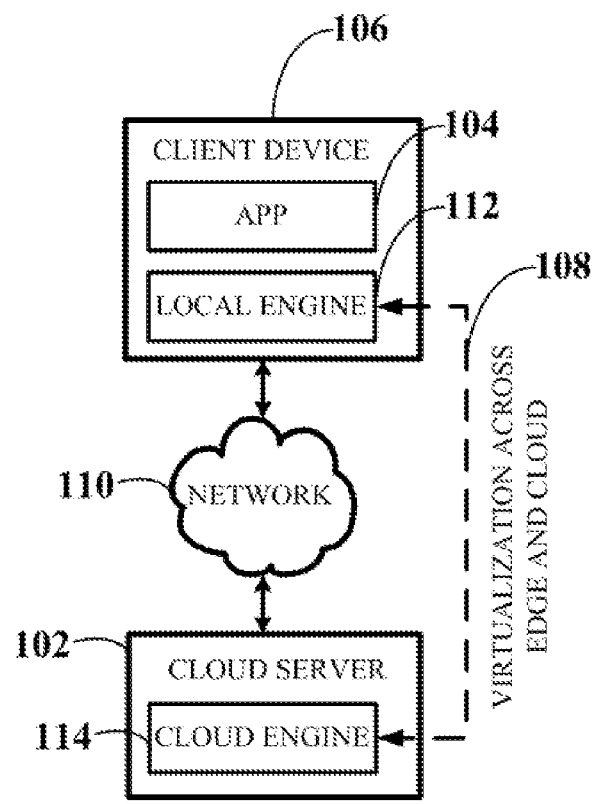
FIGS. 1A-B depict a system enabling software engine virtualization and dynamic resource and task distribution across edge and cloud, according to an embodiment.
Figure 1B:
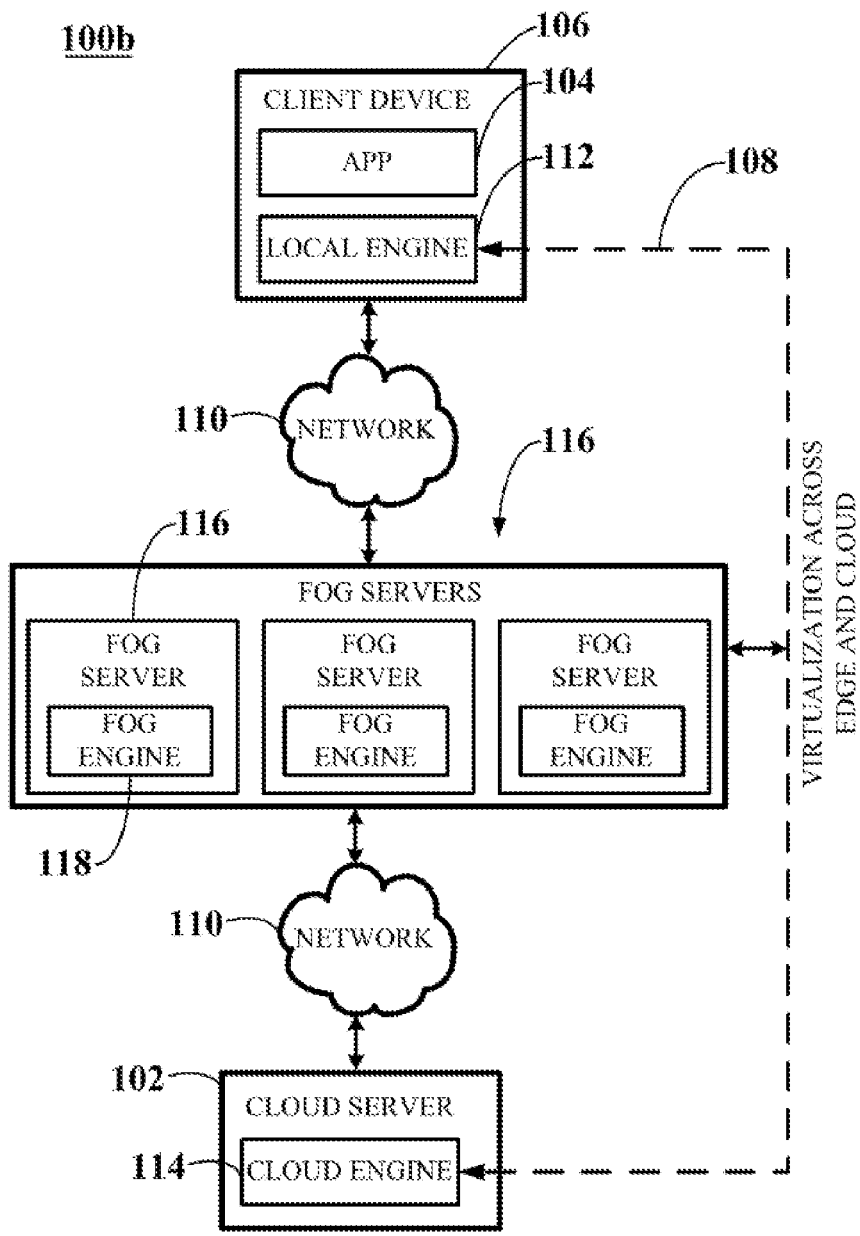

FIGS. 1A-B depict systems 100a-b enabling software engine virtualization and dynamic resource and task distribution across edge and cloud, according to an embodiment.

Making reference to FIG. 1A, according to an embodiment, the system 100a comprises a cloud server 102 comprising memory and at least one processor, the cloud server 102 being configured to store and process application data from one or more applications 104; one or more client devices 106 configured to store and process application data from the one or more applications 104; and a virtual layer 108 that connects the client device 106 and cloud server 102 via a network 110. The system 100 further comprises one or more software engines installed in at least one of the cloud server 102 or client devices 106. Thus, as shown in FIG. 1A, the system 100 may comprise a local engine 112 installed in a client device 106, and a cloud engine 114, installed in a cloud server 102. Although some functions in examples disclosed herein as being performed by a single server (e.g., a single cloud server 102), it will be understood that functions described herein as being performed by a single server may instead be performed by multiple server computers, or vice versa.

Making reference to FIG. 1B, in another embodiment, the system 100b comprises a cloud server 102 comprising memory and at least one processor, the cloud server 102 being configured to store and process application data from one or more applications 104; one or more client devices 106 configured to store and process application data from the one or more applications 104; one or more fog servers 116 configured to assist the cloud server 102 and client devices 106 in the processing of application data from the one or more applications 104; and a virtual layer 108 that connects the client device 106 and cloud server 102 via a network 110. The system 100 further comprises one or more software engines installed in at least one of the cloud server 102, fog servers 116, and client devices 106. Thus, the system 100 may comprise a local engine 112 installed in a client device 106, a fog engine 118 installed in a fog server 116, and a cloud engine 114, installed in a cloud server 102.

The virtual layer 108 connected to the one or more client devices 106, cloud servers 102, and/or fog servers 116 via the network 110 enables virtualization of one or more system network components, applications, and engine components that are optimized based on application requirements, and allocated and distributed across edge and cloud on demand Both cloud server 102 and fog servers 116 provide data, compute, storage, and application services to end-users employing client devices 106 that may enable servicing, distributing, computing, streaming and/or rendering digital content from the one or more applications. Using a cloud to edge computing network, access to computing power, computer infrastructure (e.g., through so-called infrastructure as a service, or IaaS), applications, and business processes can be delivered as a service to users via client devices on demand. The distinguishing fog characteristics are the proximity to end-users, a dense geographical distribution, and support for mobility. Services can be hosted at end-devices such as set-top boxes or access points. Fog provides low latency, location awareness, and improves quality of services (QoS) for streaming and real-time applications 104 (e.g., in industrial automation, transportation, networks of sensors and actuators), and supports heterogeneity. Fog devices may include end-user devices, access points, edge routers, and switches, amongst others, spanning multiple management domains.

In some aspects of the current disclosure, the real world is virtualized into a persistent virtual world system comprising virtual replicas of real world elements. The virtual replicas may be stored in a database or data structure stored across the edge and the cloud, and may be linked to the real world elements via sensing mechanisms, e.g., temperature sensors, proximity sensors, inertial sensors (e.g., inertia measuring units, accelerometers, gyroscopes, and magnetometers), infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof. In an embodiment, a persistent virtual world system includes a virtualized version of the real world comprising real-world coordinates, such as 3D position, orientation, and scale of real objects, including latitudinal and longitudinal positional and orientation data, which are incorporated into the settings of the virtual replicas of the real world. The persistent virtual world system can include a detailed world map according to a real-life model where each entity (e.g., buildings, trees, people, etc.) is modeled based on real-world data, but which may, as well, includes virtual objects not based on real-world data. The persistent virtual world system may be divided into virtual cells, which are minute pieces of the virtual world that are managed across a plurality of computer nodes allocating required computing resources. Furthermore, resource optimization techniques of the current disclosure may be provided in either a virtual or a real world scenario in any of virtual reality, augmented reality, or mixed reality.

Modeling techniques for converting real-world objects into virtual replicas may be based on techniques known in the art. In one embodiment, the virtual replicas may be modeled based on readily-available computer-assisted drawing (CAD) models of the real-world elements. For example, machine owners may provide already-existing digital CAD models of their machines. Similarly, building owners or government authorities may provide building information models (BIMs), which are digital representation of physical and functional characteristics of a facility, and store them in the persistent virtual world system. In other embodiments, the virtual replicas may be modeled trough car or drone-based image-scanning pipelines to be input through a variety of photo, video, depth simultaneous location and mapping (SLAM) scanning In other embodiments, radar-imaging, such as synthetic-aperture radars, real-aperture radars, Light Detection and Ranging (LIDAR), inverse aperture radars, monopulse radars, and other types of imaging techniques may be used to map and model real-world elements before integrating them into the persistent virtual world system. Radar-imaging solutions may be performed especially in cases where the original models of the structures are not available, or in cases where there is missing information or there is a need to add additional information to the virtual world entities which is not provided by the CAD models.

The virtual replicas in the persistent virtual world system can be developed based on the shape, location, position and orientation, other properties (e.g., physical and logical properties) and the expected functioning and systemic impact (e.g., energy consumption, traffic behavior, carbon emissions, etc.) of each of the real objects from which the virtual replicas are based. Thus, for example, the virtual replicas may include data and instructions that are input through software modules and tools included in a replica editor (not shown) configured to input the data and instructions of each virtual replica that can enable configuring each of these properties. However, the virtual replicas may also represent objects that do not exist in real life, such as purely virtual objects. These virtual replicas representing purely virtual objects can also be positioned with respect to the location of real objects, and may also have applications virtually attached thereupon.

In some embodiments, a virtual replica includes one or more of 3D world and building data, such as SLAM or derivate-mapping based data; 3D geometry data; 3D point cloud data; or geographic information system data representing real-world structural properties that may serve to model a 3D structure for digital reality applications.

In the current disclosure, the term "persistent" is used to characterize a state of a system that can continue to exist without a continuously executing process or network connection. For example, the term "persistent" may be used to characterize the virtual world system where the virtual world system and all of the virtual replicas, purely virtual objects and applications therein comprised continue to exist after the processes used for creating the virtual replicas, purely virtual objects and applications cease, and independent of users being connected to the virtual world system. Thus, the virtual world system is saved in a non-volatile storage location (e.g., in a server). In this way, virtual replicas, purely virtual objects and applications may interact and collaborate with each other when being configured for accomplishing specific goals even if users are not connected to the server.

Figure 2A:
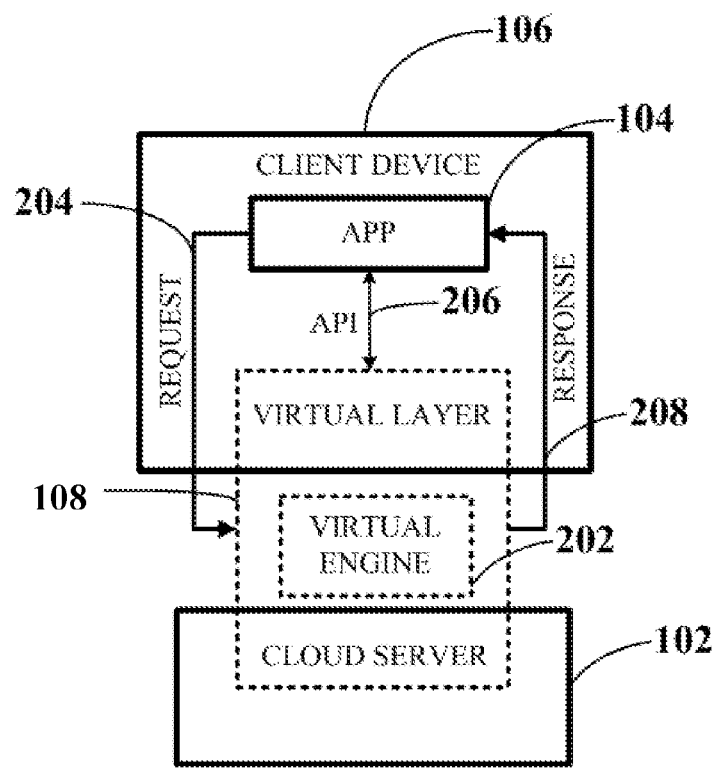
FIGS. 2A-B depict a system enabling software engine virtualization and dynamic resource and task distribution across edge and cloud, describing a virtual layer, according to an embodiment.
Figure 2B:
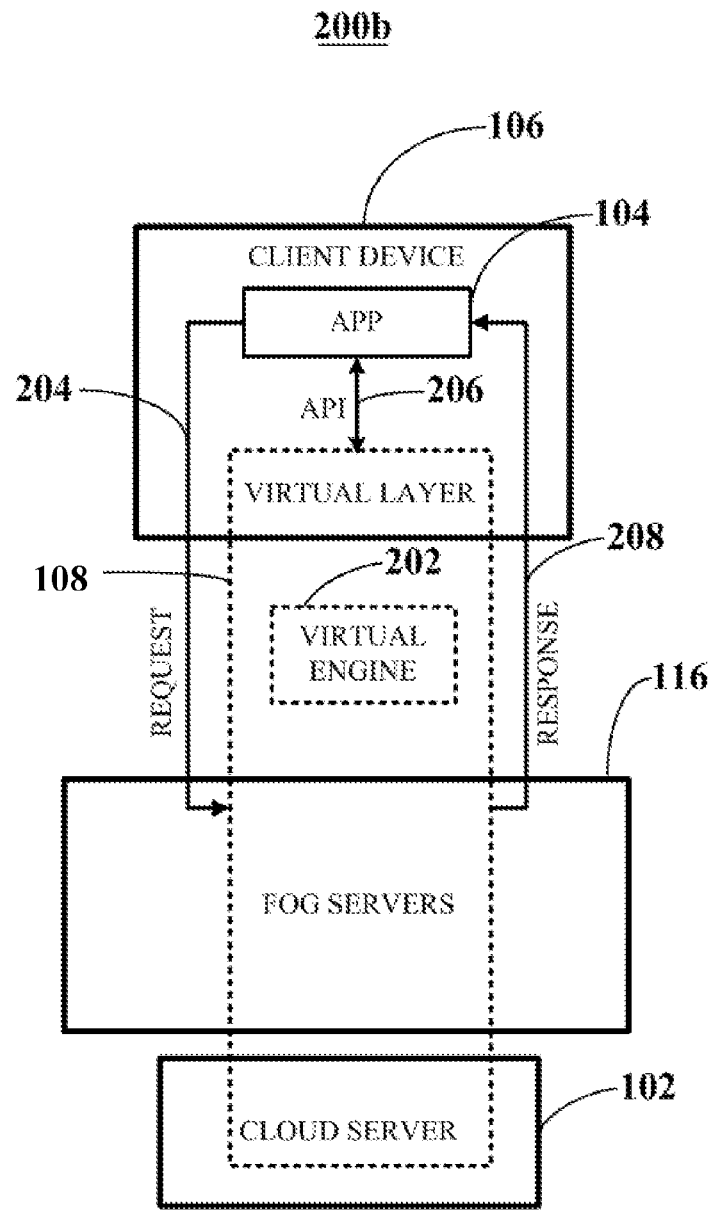

FIGS. 2A-B depict systems 200a-b enabling software engine virtualization and dynamic resource and task distribution across edge and cloud, describing a virtual layer 108 including a virtual engine 202, according to an embodiment. Some elements of FIG. 2A-B may be similar to elements of FIG. 1, and thus similar or identical reference numerals may be used to depict those elements.

Making reference to system 200a of FIG. 2A, as the network resources are available within the virtual layer 108, the application 104 may dynamically request 204 resources along with engine tasks via a predefined interface, such as an application programming interface (API 206), and receive a response 208 via the API 206, from one or more of the client device 106 and cloud server 102 through the virtual layer 108. The virtual engine 202 represents a virtualized form of one or more software engines installed in one or more of the client device 106 and cloud server 102, and comprises an integrated repository of resources and engine tasks that can be dynamically distributed according to optimization parameters included in the virtual engine 202. The API 206 ensures that edge processing function and the cloud computing system can communicate with each other effectively and dynamically allocate resources and tasks.

Making reference to system 200b of FIG. 2B, the application 104 may dynamically request 204 resources along with engine tasks via API 206, and receive a response 208 via the API 206, from one or more of the client device 106, fog servers 116, and cloud server 102 through the virtual layer 108. The virtual engine 202 represents a virtualized form of one or more software engines installed in one or more of the client device 106, fog servers 116 and cloud server 102, and comprises an integrated repository of resources and engine tasks that can be dynamically distributed according to optimization parameters included in the virtual engine 202.

Virtualization may be created by generating a virtualized or logical representation of all data center resources including, without limitations, hardware such as routers, switches, load balancers, WAN accelerators, firewalls, VPN concentrators, DNS/DHCP servers, workload/virtual machines, file systems, network attached storage systems, object storage, and backup storage, amongst others. By virtualizing resources, the physical location of the actual components may not be relevant when their services are requested by applications.

Applications and software engines can be virtualized within the virtual layer 108 across edge and cloud by encapsulating them from the underlying operating system on which they are executed. Virtualization enables applications to be seamlessly and remotely deployed and maintained. A fully virtualized application or software engine does not need to be installed to be executed. The application or engine believes that it is directly interfacing with the original operating system and the resources managed by the operating system. For example, as described in U.S. Pat. No. 7,451,196, applications can be virtualized by providing a file system overlay on a target device by configuring a file system hook operatively interposed between a file system manager and a file system driver of the target device. The file system hook is configured to detect a file system call corresponding to a target application and invoking one or more procedures. An agent procedure also executes on the target device to configure the file system hook for executing the target application. The one or more invoked procedures may include, for example, accessing data at a server terminal operatively coupled to the target device via a data network or at a locally connected computer readable storage medium. Other suitable virtualization techniques known in the art may be additionally be used in the current disclosure.

Figure 3:
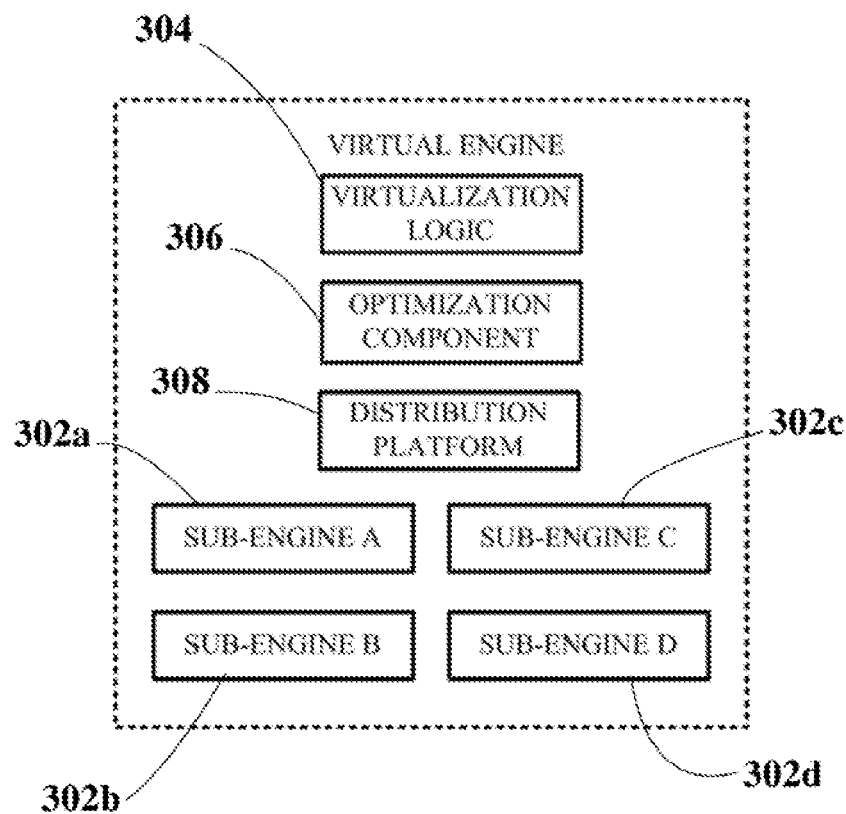
FIG. 3 depicts a virtual engine for use in a system enabling software engine virtualization and dynamic resource and task distribution across edge and cloud, according to an embodiment.

FIG. 3 depicts a virtual engine 202 that can be used in a system enabling software engine virtualization and dynamic resource and task distribution across edge and cloud, according to an embodiment. Some elements of FIG. 3 may be similar to elements of FIG. 1-2B, and thus similar or identical reference numerals may be used to depict those elements. The virtual engine 202 comprises one or more sub-engines 302a-d; a virtualization logic component 304; an optimization component 306; and a distribution platform 308.

The one or more sub-engines 302a-d include a plurality of function-specific modules. For example, the sub-engines 302a-d corresponding to a game engine may comprise one or more of an audio engine, a physics engine, a graphics engine, an AI engine, a search engine, amongst others, which may be called during the design and run-time for processing and rendering of a game or other interactive application.

The virtualization logic component 304 comprises the computer logic instructions stored in virtual memory within a virtual layer, such as the virtual layer 108 of FIGS. 1-2B, and which are used to define the logical partitions, or virtual machines that are used during the system virtualization including the virtualization of the one or more software engines and resources. The virtualization logic component 304 may include the one or more hypervisors including required computer software, firmware, or hardware that creates and runs the virtual machines. The hypervisor in the virtualization logic component 304 creates an abstraction that allows the underlying host machine hardware to independently operate one or more virtual machines as guests, allowing multiple guest VMs to effectively share the system's physical computing resources, such as processor cycles, memory space, network bandwidth, and the like.

The optimization component 306 comprises computer logic instructions stored in virtual memory within the virtual layer, including optimization parameters that define how to distribute engine tasks and system resources across edge and cloud in order to process workloads.

The distribution platform 308 comprises computer logic instructions stored in virtual memory within the virtual layer, and performs resource and task allocation across edge and cloud based on resource allocation parameters defined in the optimization component 306.

Figure 4:
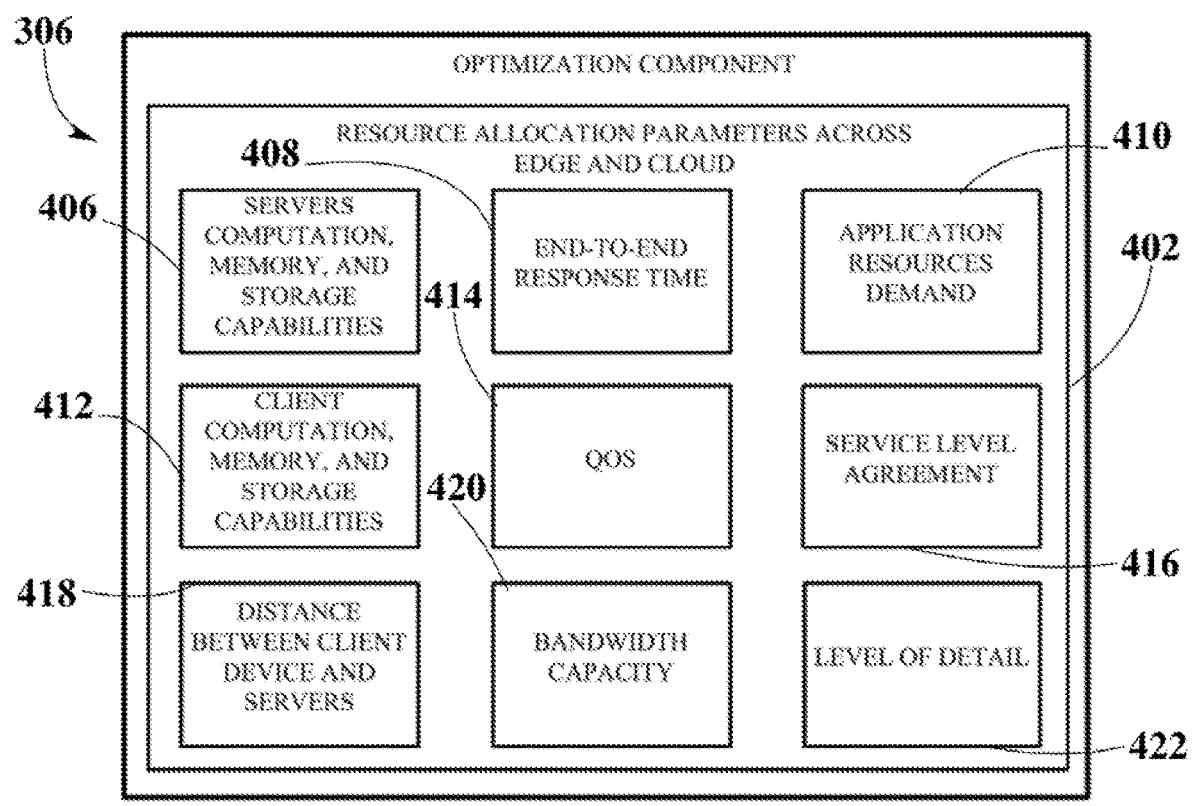
FIG. 4 depicts an optimization component for use in a system enabling software engine virtualization and dynamic resource and task distribution across edge and cloud, according to an embodiment.

FIG. 4 depicts an optimization component 306 that may be used in a system enabling software engine virtualization and dynamic resource and task distribution across edge and cloud, describing, according to an embodiment. Some elements of FIG. 4 may be similar to elements of FIGS. 1-3, and thus similar or identical reference numerals may be used to depict those elements.

The optimization component 306 includes instructions comprising resource allocation parameters 402 across edge and cloud. The resource allocation parameters 402 are persistently and dynamically assessed in order to coordinate engine distribution and allocate resources accordingly, and may include one or more of servers' computation, memory, and storage capabilities 406; end-to-end response time 408; application resources demand 410; client computation, memory, and storage capabilities 412; quality of service 414; service level agreement 416; distance between client devices and servers 418; bandwidth capacity 420; and level of detail 422, amongst others.

"Level of detail" refers to the adjustment of the details viewed by a user depending on the distance between the point of view of a user and an object. More specifically, LOD uses more detailed models only where the point of view of the user is closer to the object. LOD management increases the efficiency of rendering by decreasing the workload on graphics pipeline usage, typically vertex transformations. In general, LOD management may improve framerates and reduce memory usage. In this way, for example, different physical models can be associated to the virtual replicas, from low to high fidelity models, so that different simulations can be done depending on the case and situation. For example, a macro-simulation of the traffic in a city can be computed using low-fidelity models, but a micro-simulation using a high-fidelity model may be used to assist the autonomous driving of a vehicle.

Figure 5A:
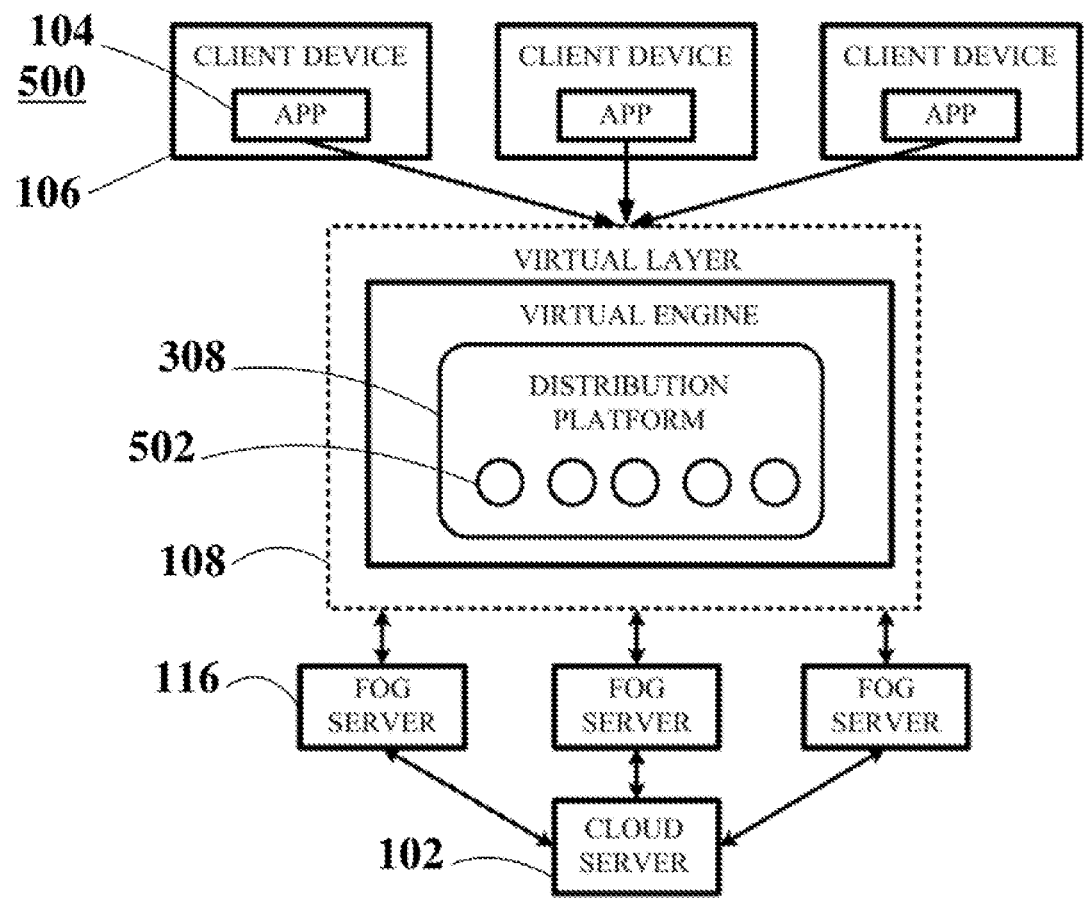
FIGS. 5A-B depict a system enabling software engine virtualization and dynamic resource and task distribution across edge and cloud, describing a distribution platform, according to an embodiment.
Figure 5B:
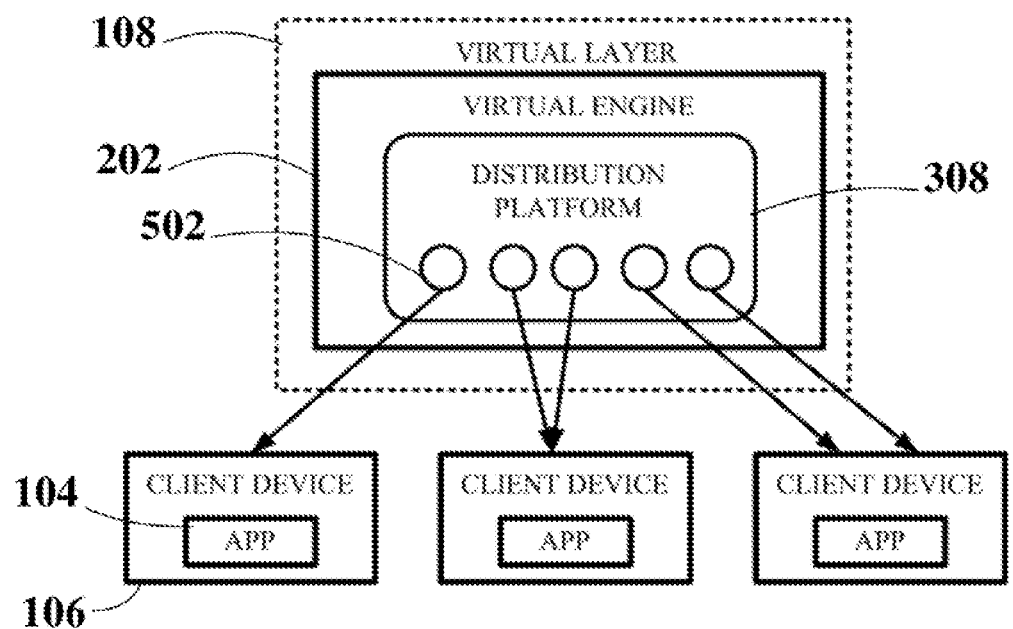

FIGS. 5A-B depict a system 500 enabling software engine virtualization and dynamic resource and task distribution across edge and cloud, describing a distribution platform 308, according to an embodiment. Some elements of FIGS. 5A-B may be similar to elements of FIGS. 1-4, and thus similar or identical reference numerals may be used to depict those elements.

Making reference to FIG. 5A, the distribution platform 308 of the virtual engine 202 includes one or more virtual cells 502, or topics, linked to a plurality of physical network resources, the virtual cells 502 being configured to retrieve and allocate corresponding resources and engine tasks across edge and cloud to end-users. The distribution platform 308 may be, for example, a distributed message exchange service. The distribution platform 308 may be implemented in one or more several thousands of nodes, or virtual cell hosts, which may be virtually hosted in the virtual layer 108, and physically in one or more client devices 106, fog servers 116, or cloud servers 102. A single instance of the distribution platform 308 may service anywhere from one to several millions of virtual cells 502. Furthermore, a plurality of service instances (e.g., thousands) may act on one or several million virtual cells 502. In some embodiments, two or more nodes may also be setup for replication, which can be helpful in dynamic load balancing. In further embodiments, as viewed with reference to FIG. 5B, one or more virtual cells 502 may distribute resources to one or more client devices 106, which may be especially useful for highly demanding applications.

The virtual cells 502 may additionally be assigned to locations in the real or virtual world, such that when a user requests services from a location, a virtual cell 502 may already be assigned to allocate resources from pre-determined sources to the location of the end-user. In some embodiments, the locations in the real or virtual world to which the virtual cells 502 may be assigned can be changed depending on optimization rules or as decided by a system administrator or designer.

The distribution platform 308 implements caching of states within each virtual cell 502. For example, the virtual cells 502 may cache all the applications 104, virtual elements, or real elements, and their states within the corresponding virtual cells 502. When a service subscribes to a certain virtual cell 502, the service first receives all the cached states and subsequently receives the updates until finishing the subscription to the topic.

The distribution platform 308 may follow a classic publish-subscribe paradigm, whereby the services may publish or subscribe to various virtual cells 502. The various services may be, for example, rendering, computing, simulating, and IoT updates. Thus, for example, a single client device 106 device may receive services from a plurality of sources, such as from a plurality of client devices 106, fog servers 116, or cloud server 102.

Figure 6A:
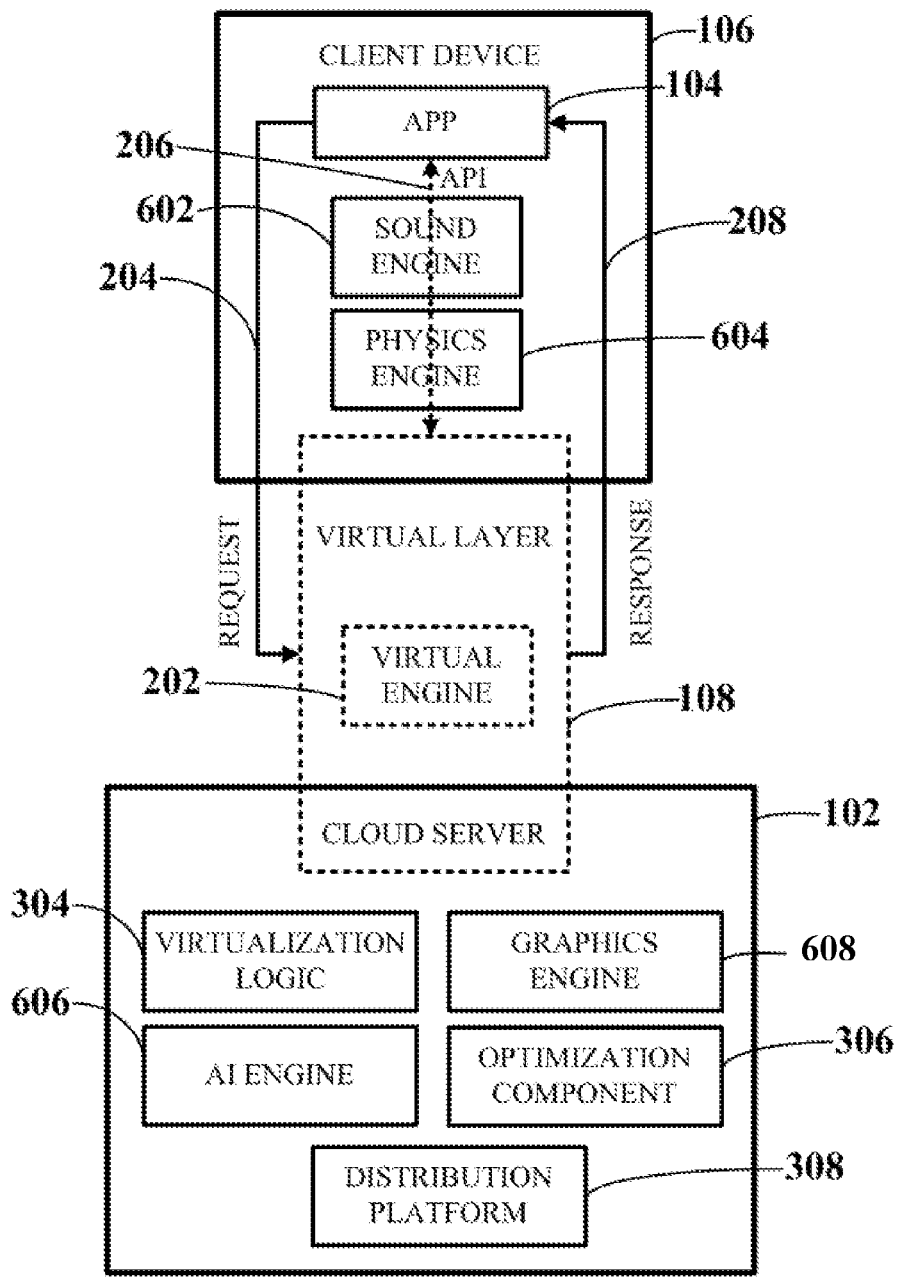
FIGS. 6A-B depict a system enabling software engine virtualization and dynamic resource and task distribution across edge and cloud, describing an exemplary engine distribution across edge and cloud, according to an embodiment, according to an embodiment.
Figure 6B:
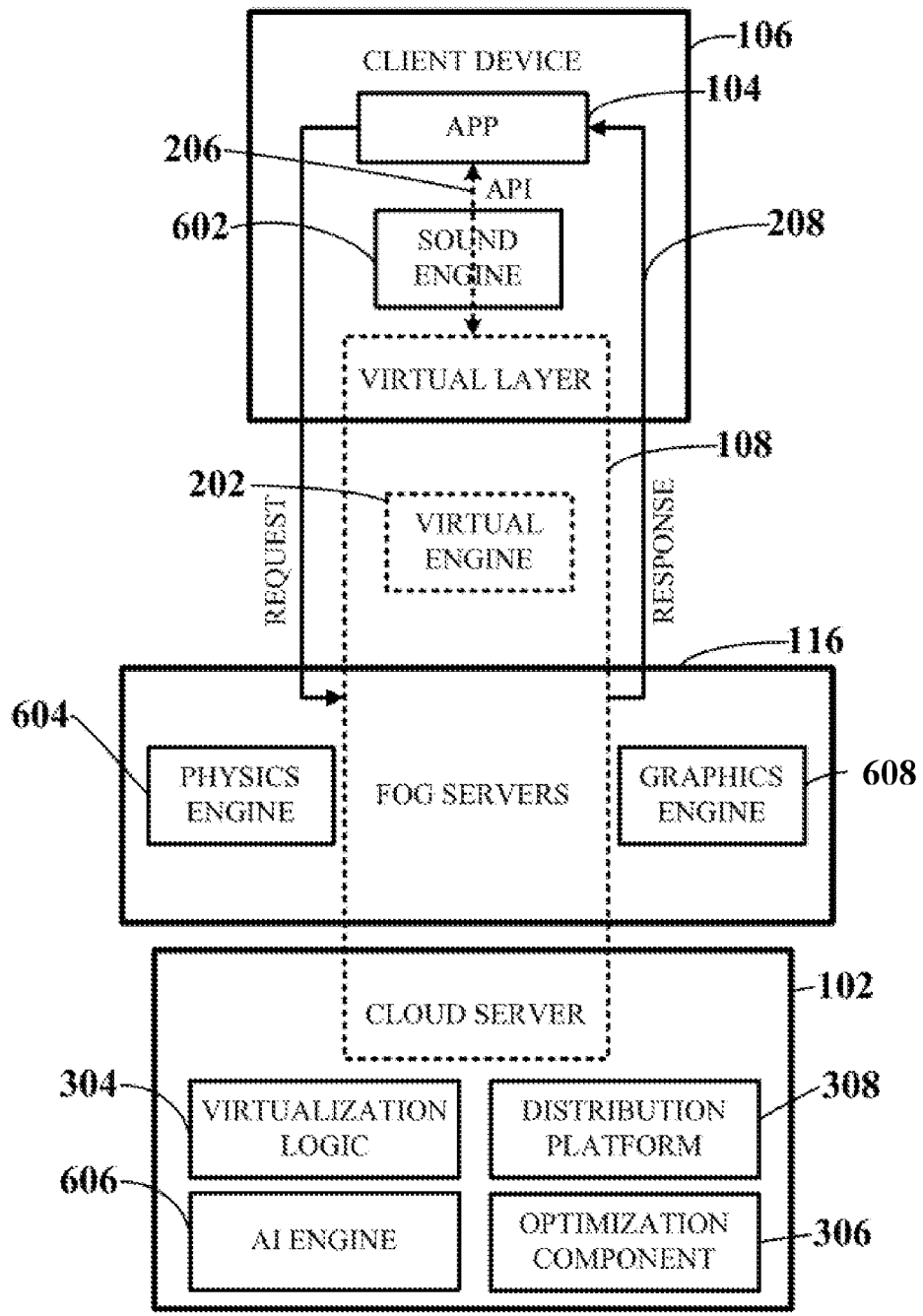

FIGS. 6A-B depict systems 600a-b enabling software engine virtualization and dynamic resource and task distribution across edge and cloud, describing an exemplary engine distribution across edge and cloud, according to an embodiment. Some elements of FIGS. 6A-B may be similar to elements of FIGS. 1-5B, and thus similar or identical reference numerals may be used to depict those elements.

Making reference to FIG. 6A, as the network resources are available within the virtual layer 108, the application 104 may dynamically request 204 resources along with engine tasks via API 206 and receive a response 208 via the API 206, from one or more of a client device 106 and cloud server 102 through the virtual layer 108. The optimization component 306 and distribution platform 308 of the virtual engine 202 can allocate resources tasks of function-specific engine tasks between the client device 106 and cloud server 102. In the example shown in FIG. 6A, the virtual engine 202 distributes functions of a sound engine 602 and physics engine 604 to a client device 106, and distributes functions of the virtualization logic component 304, an artificial intelligence (AI) engine 606, a graphics engine 608, optimization component 306, and distribution platform 308 to the cloud server 102.

Making reference to FIG. 6B, the application 104 may dynamically request 204 resources along with engine tasks via API 206 and receive a response 208 via the API 206, from one or more of a client device 106, fog servers 116, and cloud server 102 through the virtual layer 108. The optimization component 306 and distribution platform 308 of the virtual engine 202 can allocate resources of function-specific engine tasks between the client device 106, fog servers 116, and cloud server 102. In the example embodiment shown in FIG. 6A, the virtual engine 202 distributes functions of a sound engine 602 to a client device 106, distributes functions of a physics engine 604 and graphics engine 508 to the fog servers 116, and distributes functions of the virtualization logic component 304, AI engine 606 and optimization component 306 to the cloud server 102.

Figure 7:
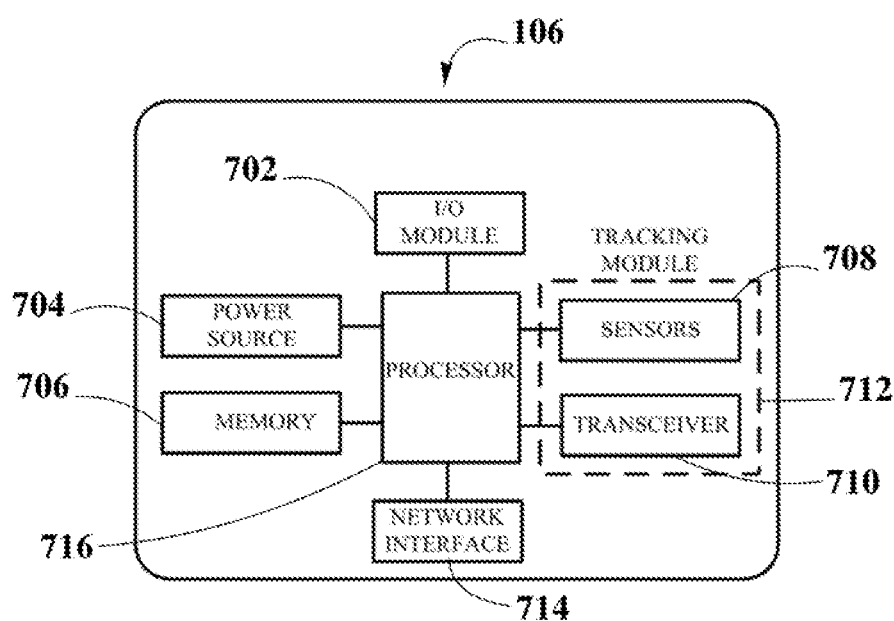
FIG. 7 depicts a client device for use in a system enabling software engine virtualization and dynamic resource and task distribution across edge and cloud, according to an embodiment.

FIG. 7 depicts a client device 106 that may be used in a system enabling software engine virtualization and dynamic resource and task distribution across edge and cloud, according to an embodiment.

A client device 106 may include operational components such as an input/output (I/O) module 702; a power source 704; a memory 706; sensors 708 and transceivers 710 forming a tracking module 712; and a network interface 714, all operatively connected to a processor 716.

The I/O module 702 is implemented as computing hardware and software configured to interact with users and provide user input data to one or more other system components. For example, I/O module 702 may be configured to interact with users, generate user input data based on the interaction, and provide the user input data to the processor 716 before being transferred to other processing systems via a network, such as to a server. In another example, I/O modules 702 is implemented as an external computing pointing device (e.g., a touch screen, mouse, 3D control, joystick, gamepad, and the like) and/or text entry device (e.g., a keyboard, dictation tool, and the like) configured to interact with client devices 106. In yet other embodiments, I/O module 702 may provide additional, fewer, or different functionality to that described above.

The power source 704 is implemented as computing hardware and software configured to provide power to the client devices 106. In one embodiment, the power source 704 may be a battery. The power source 704 may be built into the devices or removable from the devices, and may be rechargeable or non-rechargeable. In one embodiment, the devices may be repowered by replacing one power source 704 with another power source 704. In another embodiment, the power source 704 may be recharged by a cable attached to a charging source, such as a universal serial bus ("USB") FireWire, Ethernet, Thunderbolt, or headphone cable, attached to a personal computer. In yet another embodiment, the power source 704 may be recharged by inductive charging, wherein an electromagnetic field is used to transfer energy from an inductive charger to the power source 704 when the two are brought in close proximity, but need not be plugged into one another via a cable. In another embodiment, a docking station may be used to facilitate charging.

The memory 706 may be implemented as computing hardware and software adapted to store application program instructions. The memory 706 may be of any suitable type capable of storing information accessible by the processor 716, including a computer-readable medium, or other medium that stores data that may be read with the aid of an electronic device, such as a hard-drive, memory card, flash drive, ROM, RAM, DVD or other optical disks, as well as other write-capable and read-only memories. The memory 706 may include temporary storage in addition to persistent storage.

The sensors 708 may also include one or more Inertia Measuring Units (IMUs), accelerometers, and gyroscopes. The IMU is configured to measure and report the velocity, acceleration, angular momentum, speed of translation, speed of rotation, and other telemetry metadata of client devices 106 by using a combination of accelerometers and gyroscopes. Accelerometers within the IMU and/or configured separate from the IMU may be configured to measure the acceleration of the interaction device, including the acceleration due to the Earth's gravitational field. In one embodiment, accelerometers include a tri-axial accelerometer that is capable of measuring acceleration in three orthogonal directions. The sensors 708 of the client devices 106 may also include one or more cameras. For example, the cameras may be depth-cameras installed in the client devices. The cameras may be configured to capture and provide the viewing position and orientation of the user The transceivers 710 may be implemented as computing hardware and software configured to enable devices to receive wireless radio waves from antennas and to send the data back to the antennas. In some embodiments, mmW transceivers may be employed, which may be configured to receive mmW wave signals from antennas and to send the data back to antennas when interacting with immersive content. The transceiver 710 may be a two-way communication transceiver 710.

In an embodiment, the tracking module 712 may be implemented by combining the capabilities of the IMU, accelerometers, and gyroscopes with the positional tracking provided by the transceivers 710 and the accurate tracking, low-latency and high QOS functionalities provided by mmW-based antennas may enable sub-centimeter or sub-millimeter positional and orientational tracking, which may increase accuracy when tracking the real-time position and orientation of client devices 106. In alternative embodiments, the sensing mechanisms and transceivers 710 may be coupled together in a single tracking module device.

The network interface 714 may be implemented as computing software and hardware to communicatively connect to a network, receive computer readable program instructions from the network sent by the server or by client devices 106, and forward the computer readable program instructions for storage in the memory 706 for execution by the processor 716.

The processor 716 may be implemented as computing hardware and software configured to receive and process data such as sensor data, digital reality application data and instructions. For example, the processor 716 may be configured to provide imaging requests, receive imaging data, process imaging data into environment or other data, process user input data and/or imaging data to generate user interaction data, perform edge-based (on-device) machine learning training and inference, provide server requests, receive server responses, and/or provide user interaction data, environment data, and content object data to one or more other system components. For example, the processor 716 may receive user input data from I/O module 702 and may respectively implement application programs stored in the memory 706. In other examples, the processor 716 may receive data from sensing mechanisms captured from the real world, or may receive an accurate position and orientation of client devices 106 through the tracking module 712, and may prepare some of the data before sending the data to a server for further processing.

Figure 8:
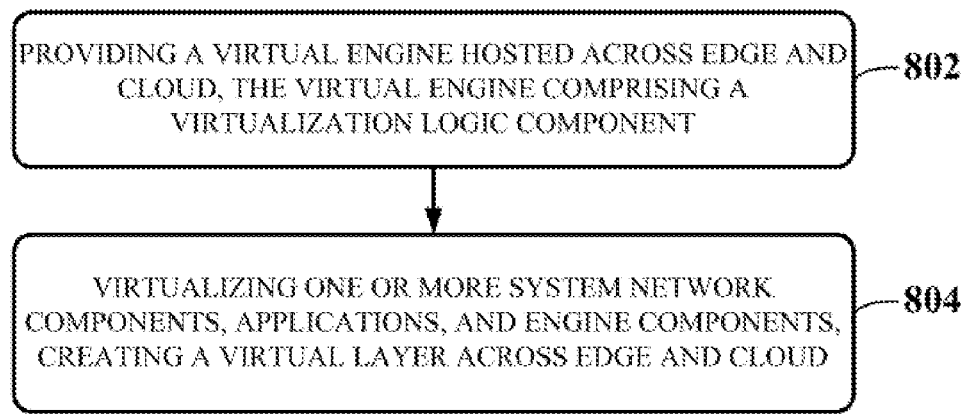
FIG. 8 depicts a method enabling software engine virtualization across edge and cloud, according to an embodiment.

FIG. 8 depicts a method 800 enabling software engine virtualization across edge and cloud, according to an embodiment. The method 800 may be implemented by a system, such as by the systems described with reference to FIGS. 1A-7.

The method 800 begins in step 802 by providing a virtual engine hosted across one or more cloud servers and client devices connected via a network, the virtual engine comprising a virtualization logic component. The method 800 ends in step 804 by virtualizing, by the virtualization logic component of the virtual engine, one or more system network components, applications, and engine components, creating a virtual layer connected to the one or more client devices and cloud servers via the network.

Figure 9:
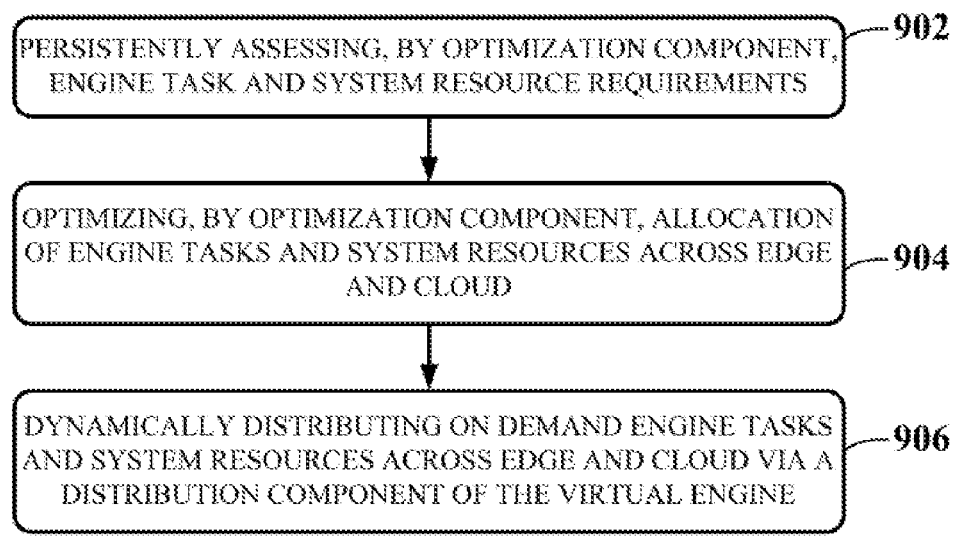
FIG. 9 depicts a method enabling dynamic resource and task distribution across edge and cloud, according to an embodiment.

FIG. 9 depicts a method 900 enabling dynamic resource and task distribution across edge and cloud that may be used in through the virtual layer created, for example, in method 800 of FIG. 8. The method 900 may be implemented by a system, such as by the systems described with reference to FIGS. 1A-7.

Method 900 begins in step 902 by persistently assessing, by at least one optimization component in the virtual engine, engine task and system resource requirements from the one or more applications. Then, in step 904, the method 900 continues by optimizing, by the at least one optimization component in the virtual engine, the allocation of engine tasks and system resources based on said assessment. Finally, method 900 may end in step 906 by dynamically distributing on demand engine tasks and system resources across edge and cloud via a distribution component of the virtual engine based on the optimization performed by the at least one optimization component.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A system enabling software engine virtualization and dynamic resource and task distribution across edge and cloud, comprising:

at least one cloud server comprising memory and at least one processor, the at least one cloud server hosting a virtualization logic component and at least one cloud engine of a software three-dimensional (3D) game engine, the at least one cloud engine configured to store and process application data from a digital reality applications that uses the software 3D game engine;

one or more client devices connected to the at least one cloud server via a network, the one or more client devices hosting at least one local engine of the software 3D game engine, the at least one local engine configured to store and process application data from the digital reality applications and to provide output to users;

a virtual engine hosted across edge and cloud, the virtual engine configured to virtualize, via the virtualization logic component, one or more system network components, the digital reality applications, and components of the at least one cloud engine and the at least one local engine, creating a virtual layer connected to the one or more client devices and the at least one cloud server via the network, and at least one system resource distribution platform comprising virtual cells linked to a plurality of physical network resources, wherein the virtual cells comprise divisions of a virtual world in the digital reality application, and wherein the virtual engine is further configured to dynamically allocate function-specific 3D game engine tasks of the software 3D game engine for running the digital reality applications between the one or more client devices and the at least one cloud server.

2. The system of claim 1, further comprising one or more fog servers comprising memory and at least one processor, the fog servers being located in areas proximate to the one or more client devices and configured to assist the at least one cloud server and the one or more client devices in the processing of application data from the digital reality applications, wherein the functions of the fog servers are abstracted within the virtual layer.

3. The system of claim 2, wherein the digital reality applications are hosted by the one or more client devices, cloud servers, fog servers, or combinations thereof.

4. The system of claim 2, wherein the virtual engine further comprises one or more function-specific sub-engines corresponding to the digital reality applications comprising one or more of an audio engine, a physics engine, a graphics engine, or an artificial intelligence ("AI") engine, and wherein tasks associated with the one or more function-specific sub-engines are performed by the one or more client devices, the one or more fog servers, and the at least one cloud server.

5. The system of claim 1, wherein the virtual engine further comprises:
at least one optimization component configured to assess engine task and system resource requirements from the digital reality applications and to optimize the resource and task allocation based on said assessment; and
at least one system resource distribution platform configured to distribute required engine tasks and system resources across edge and cloud on demand based on the optimization of the at least one optimization component.

6. The system of claim 5, the virtual cells comprise divisions of the virtual world system in which the resource and task allocation is performed.

7. The system of claim 6, wherein two or more of the virtual cells may be used in combination in order to dynamically allocate resources and engine tasks to the one or more client devices.

8. The system of claim 5, wherein the optimization component utilizes resource allocation parameters comprising one or more of server capabilities; client capabilities; end-to-end response time; application resources demand; demanded and available quality of service; service level agreement; distance between devices and servers; bandwidth capacity; or required level of detail, or combinations thereof.

9. The system of claim 1, wherein the virtual engine further comprises one or more function-specific sub-engines.

10. The system of claim 1, wherein the network comprises millimeter-wave (mmW) or combinations of mmW and sub 6 GHz communication systems, or a wireless local area network.

11. The system of claim 1, wherein the one or more client devices include one or more mobile devices, personal computers, game consoles, media centers, smart contact lenses, or head-mounted displays.

12. The system of claim 1, wherein the virtual engine further comprises one or more function-specific sub-engines corresponding to the digital reality applications comprising one or more of an audio engine, a physics engine, a graphics engine, or an artificial intelligence ("AI") engine, and wherein tasks associated with the one or more function-specific sub-engines are performed by the one or more client devices and the at least one cloud server.

13. A method enabling software engine virtualization and distribution across edge and cloud, comprising:
providing a virtual engine hosted across one or more cloud servers and one or more client devices connected via a network, the virtual engine comprising a virtualization logic component, wherein the virtual engine is configured to dynamically allocate function-specific three-dimensional (3D) game engine tasks of a software 3D game engine for running a digital reality applications between the one or more client devices and the one or more cloud servers;
virtualizing, via the virtualization logic component of the virtual engine, one or more system network components, the digital reality applications that uses the software 3D game engine, and components of the software 3D game engine, creating a virtual layer connected to the one or more client devices and the one or more cloud servers via the network; and
dynamically distributing on demand engine tasks and system resources via a distribution component of the virtual engine,
wherein the distribution component comprises virtual cells linked to a plurality of physical network resources, wherein the virtual cells comprise divisions of a virtual world system.

14. The method of claim 13, further comprising providing one or more fog servers comprising memory and at least one processor, the one or more fog servers being located in areas proximate to the one or more client devices and configured to assist the one or more cloud servers and the one or more client devices in the processing of application data from the digital reality applications, wherein the functions of the one or more fog servers are abstracted within the virtual layer.

15. The method of claim 14, wherein the digital reality applications are hosted by the one or more client devices, the one or more cloud servers, the one or more fog servers, or combinations thereof.

16. The method of claim 13, further comprising:
assessing, by at least one optimization component in the virtual engine, engine task and system resource requirements from the digital reality applications;
optimizing, by the at least one optimization component in the virtual engine, the allocation of engine tasks and system resources based on said assessment; and
dynamically distributing the on demand engine tasks and the system resources across the edge and the cloud via the distribution component of the virtual engine based on the optimization performed by the at least one optimization component.

17. The method of claim 16, wherein the at least one optimization component utilizes resource allocation parameters comprising one or more of server capabilities; client capabilities; end-to-end response time; application resources demand;
demanded and available quality of service; service level agreement; distance between devices and servers; bandwidth capacity; or level of detail, or a combination thereof.

18. The method of claim 16, wherein the virtual cells comprise divisions of the virtual world system in which the allocation of engine tasks and system resources is performed.

19. The method of claim 18, wherein two or more of the virtual cells may be used in combination in order to dynamically allocate resources and engine tasks to the one or more client devices.

20. The method of claim 13, wherein the software 3D game engine comprises one or more function-specific sub-engines.

21. The method of claim 13, wherein the network comprises millimeter-wave (mmW) or combinations of mmW and sub 6 GHz communication systems, or a wireless local area network.

22. One or more non-transitory computer-readable media having stored thereon instructions configured to, when executed by one or more computers, cause the one or more computers to enable software engine virtualization and dynamic resource and task distribution across edge and cloud by performing steps comprising:

providing a virtual engine hosted across one or more cloud servers and one or more client devices connected via a network, the virtual engine comprising a virtualization logic component, wherein the virtual engine is configured to dynamically allocate function-specific three-dimensional (3D) game engine tasks of a software 3D game engine for running a digital reality applications between the one or more client devices and the one or more cloud servers;

virtualizing, via the virtualization logic component of the virtual engine, one or more system network components, the digital reality applications that uses the software 3D game engine, and components of the software 3D game engine, creating a virtual layer connected to the one or more client devices and the one or more cloud servers via the network;

assessing, by at least one optimization component in the virtual engine, engine task and system resource requirements from the digital reality application;

optimizing, by the at least one optimization component in the virtual engine, the allocation of engine tasks and system resources based on said assessment; and dynamically distributing on demand engine tasks and system resources across edge and cloud via a distribution component of the virtual engine based on the optimization performed by the at least one optimization component, wherein the distribution component comprises virtual cells linked to a plurality of physical network resources, wherein the virtual cells comprise divisions of a virtual world system.

* * * * *